(12) United States Patent
Takashima et al.

(10) Patent No.: US 7,616,427 B2
(45) Date of Patent: Nov. 10, 2009

(54) MONOLITHIC CERAMIC CAPACITOR

(75) Inventors: Hirokazu Takashima, Echizen (JP);
Hiroshi Ueoka, Echizen (JP);
Yoshikazu Takagi, Sabae (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 399 days.

(21) Appl. No.: 11/751,218

(22) Filed: May 21, 2007

(65) Prior Publication Data

US 2007/0268651 A1 Nov. 22, 2007

(30) Foreign Application Priority Data

| May 22, 2006 | (JP) | ............................. 2006-141027 |
| Apr. 12, 2007 | (JP) | ............................. 2007-104419 |

(51) Int. Cl.
*H01G 4/06* (2006.01)

(52) U.S. Cl. .............. 361/321.2; 361/321.1; 361/306.1; 361/306.3; 361/303; 361/301.4

(58) Field of Classification Search .............. 361/321.2, 361/321.1, 303–305, 311–313, 301.1, 301.2, 361/301.4, 306.1, 306.3, 308.1
See application file for complete search history.

(56) References Cited

U.S. PATENT DOCUMENTS

| 6,072,687 | A | 6/2000 | Naito et al. |
| 6,188,595 | B1 | 2/2001 | Chevallier |
| 6,215,647 | B1 | 4/2001 | Naito et al. |
| 6,226,169 | B1 | 5/2001 | Naito et al. |
| 6,266,228 | B1 | 7/2001 | Naito et al. |
| 6,266,229 | B1 | 7/2001 | Naito et al. |
| 6,292,350 | B1 | 9/2001 | Naito et al. |
| 6,407,904 | B1 * | 6/2002 | Kuroda et al. ................ 361/303 |
| 6,430,025 | B2 | 8/2002 | Naito et al. |
| 6,441,459 | B1 | 8/2002 | Togashi et al. |
| 6,519,134 | B1 * | 2/2003 | Li et al. .................... 361/306.1 |
| 6,657,848 | B2 | 12/2003 | Togashi et al. |
| 6,816,356 | B2 * | 11/2004 | Devoe et al. ................. 361/309 |
| 6,819,543 | B2 * | 11/2004 | Vieweg et al. ............ 361/306.3 |
| 7,050,288 | B2 * | 5/2006 | Ahiko et al. ................. 361/303 |
| 7,411,776 | B2 * | 8/2008 | Aoki ........................ 361/306.3 |

(Continued)

FOREIGN PATENT DOCUMENTS

JP        11-144996 A        5/1999

(Continued)

OTHER PUBLICATIONS

Hirokazu Takashima et al.; "Monolithic Capacitor and Mounting Structure Thereof"; U.S. Appl. No. 11/616,550; filed Dec. 27, 2006.

*Primary Examiner*—Nguyen T Ha
(74) *Attorney, Agent, or Firm*—Keating & Bennett, LLP

(57) ABSTRACT

A monolithic ceramic capacitor includes a first same-polarity-electrode-connecting conductor and a second same-polarity-electrode-connecting conductor that are provided inside a ceramic laminate. The first same-polarity-electrode-connecting conductor is electrically connected to all of the first outer electrodes, and the second same-polarity-electrode-connecting conductor is electrically connected to all of the second outer electrodes. Preferably, a plurality of first same-polarity-electrode-connecting conductors and a plurality of second same-polarity-electrode-connecting conductors are successively disposed in the laminating direction inside the ceramic laminate.

14 Claims, 12 Drawing Sheets

U.S. PATENT DOCUMENTS

| | | |
|---|---|---|
| 7,433,172 B2 * | 10/2008 | Togashi ................ 361/306.1 |
| 7,567,425 B1 * | 7/2009 | Lee et al. ............... 361/306.3 |
| 2001/0055191 A1 | 12/2001 | Naito et al. |
| 2002/0171997 A1 | 11/2002 | Togashi et al. |

FOREIGN PATENT DOCUMENTS

| | | |
|---|---|---|
| JP | 2001-284170 A | 10/2001 |
| JP | 2001-284171 A | 10/2001 |
| WO | 2006067939 A1 | 6/2006 |

* cited by examiner

MONOLITHIC CERAMIC CAPACITOR

BACKGROUND OF THE INVENTION

1. Field of the Invention

The present invention relates to a monolithic ceramic capacitor, and in particular, to a monolithic ceramic capacitor having a plurality of terminals arranged to reduce equivalent series inductance (ESL).

2. Description of the Related Art

In a power supply circuit, when a voltage variation in a power supply line is increased by impedance that is present in the power supply line or a ground, the operation of circuits to be driven becomes unstable, interference between the circuits occurs due to the power supply circuit, or oscillation occurs. Consequently, a decoupling capacitor is usually connected between the power supply line and the ground. The decoupling capacitor decreases alternating impedance between the power supply line and the ground, thereby suppressing the variations in the power supply voltage and interference between the circuits.

Recently, in communication equipment such as a cell phone and information processing equipment such as a personal computer, as the speed of signals has been increased in order to process a large amount of information, the clock frequency of an IC used is also increased. Accordingly, noise that primarily includes harmonic wave components is readily generated. Therefore, it is necessary to provide a stronger decoupling in an IC power supply circuit.

In order to increase the decoupling effect, it is effective to use a decoupling capacitor having an excellent impedance-frequency characteristic. An example of such a decoupling capacitor is a monolithic ceramic capacitor. Because of its low ESL, the monolithic ceramic capacitor has an excellent noise-absorbing effect over a wide frequency band as compared to an electrolytic capacitor. As a monolithic ceramic capacitor suitable for such a decoupling, for example, Japanese Unexamined Patent Application Publication No. 11-144996 discloses a monolithic ceramic capacitor having a plurality of terminals for the purpose of further reducing ESL.

Stabilization of a power supply circuit also significantly depends on equivalent series resistance (ESR) of the capacitor. In the above-described monolithic ceramic capacitor with a decreased ESL, as the number of terminals increases, the number of leading portions of inner electrodes is also increased, resulting in a significant decrease in ESR. Accordingly, a power supply circuit including such a monolithic ceramic capacitor is disadvantageous in that the stability is not satisfactory. The monolithic ceramic capacitor in which ESL is decreased by the above-described structure has an extremely low ESR. Accordingly, when resonance is induced by inductance in the peripheral circuit, the power supply voltage markedly drops or a damped oscillation, such as ringing, easily occurs.

Consequently, for example, Japanese Unexamined Patent Application Publication No. 2001-284170 discloses a monolithic ceramic capacitor in which a marked decrease in ESR is prevented while ESL is decreased.

The monolithic ceramic capacitor described in Japanese Unexamined Patent Application Publication No. 2001-284170 includes a ceramic laminate having a plurality of laminated ceramic layers. In the monolithic ceramic capacitor, a plurality of first outer electrodes to which a first polarity is assigned and a plurality of second outer electrodes to which a second polarity is assigned are provided on side surfaces of the ceramic laminate so that the first outer electrodes and the second outer electrodes are alternately arranged. A plurality of first inner electrodes and a plurality of second inner electrodes are provided inside the ceramic laminate. Each of the first inner electrodes is electrically connected to only one of the first outer electrodes. Each of the second inner electrodes is electrically connected to only one of the second outer electrodes. In the monolithic ceramic capacitor having this structure, the ESR of the monolithic ceramic capacitor is increased because the number of leading portions of each inner electrode for electrically connecting to one of the outer electrodes is only one.

However, the monolithic ceramic capacitor described in Japanese Unexamined Patent Application Publication No. 2001-284170 has the following problems.

First, the process for determining the total capacitance of the monolithic ceramic capacitor is complex. More specifically, the total capacitance of the monolithic ceramic capacitor must be determined by adding capacitances measured between adjacent outer electrodes together. Alternatively, the total capacitance of the monolithic ceramic capacitor must be measured while all the outer electrodes are connected to a wiring substrate.

In addition, in a state in which the monolithic ceramic capacitor is mounted on a wiring substrate, with solder therebetween, when a solder crack or other defect is generated at a single position and the connection between the outer electrode and a conductor land is disconnected at only the single position, the capacitance in the case in which the inner electrode is connected to the disconnected outer electrode cannot be obtained. Consequently, the capacitance is substantially decreased.

SUMMARY OF THE INVENTION

Preferred embodiments of the present invention provide a monolithic ceramic capacitor that overcomes the above-described problems.

According to a preferred embodiment of the present invention, a monolithic ceramic capacitor includes a ceramic laminate including a plurality of laminated ceramic layers and having a first principal surface and a second principal surface facing each other and side surfaces connecting the periphery of the first principal surface and the periphery of the second principal surface, a plurality of first outer electrodes which are provided on the at least one of the side surfaces of the ceramic laminate and to which a first polarity is assigned, a plurality of second outer electrodes which are provided on the at least one of the side surfaces of the ceramic laminate and to which a second polarity is assigned, a plurality of first inner electrodes which are provided inside the ceramic laminate and each of which is electrically connected to only one of the first outer electrodes, and a plurality of second inner electrodes which are provided inside the ceramic laminate so that the second inner electrodes and the first inner electrodes are alternately disposed and each of which is electrically connected to only one of the second outer electrodes.

To solve the above technical problems, a first same-polarity-electrode-connecting conductor which is electrically connected to at least two of the first outer electrodes and a second same-polarity-electrode-connecting conductor which is electrically connected to at least two of the second outer electrodes are provided inside the ceramic laminate.

Preferably, the first same-polarity-electrode-connecting conductor is electrically connected to all of the first outer electrodes. In this case, the advantages are satisfactorily achieved by merely forming a single first same-polarity-electrode-connecting conductor inside the ceramic laminate, that is, by merely establishing an electrical connection between a single first same-polarity-electrode-connecting conductor and all of the first outer electrodes.

When a plurality of first same-polarity-electrode-connecting conductors are provided inside the ceramic laminate, these first same-polarity-electrode-connecting conductors are preferably successively disposed in the laminating direction.

Preferably, the second same-polarity-electrode-connecting conductor is also electrically connected to all of the second outer electrodes. In this case, the advantages are satisfactorily achieved by merely providing a single second same-polarity-electrode-connecting conductor inside the ceramic laminate, that is, by merely establishing an electrical connection between a single second same-polarity-electrode-connecting conductor and all of the second outer electrodes.

When a plurality of second same-polarity-electrode-connecting conductors are provided inside the ceramic laminate, these second same-polarity-electrode-connecting conductors are preferably successively disposed in the laminating direction.

In this preferred embodiment of the present invention, the first same-polarity-electrode-connecting conductor is preferably disposed between the first inner electrode of the first inner electrodes that is disposed closest to the first principal surface, and the first principal surface, the first inner electrode being adjacent to the first same-polarity-electrode-connecting conductor. In addition, the second same-polarity-electrode-connecting conductor is preferably disposed between the second inner electrode of the second inner electrodes that is disposed closest to the second principal surface, and the second principal surface, the second inner electrode being adjacent to the second same-polarity-electrode-connecting conductor.

In this preferred embodiment of the present invention, the second same-polarity-electrode-connecting conductor may be disposed between the second inner electrode of the second inner electrodes that is disposed closest to the second principal surface, and the second principal surface, the second inner electrode being adjacent to the second same-polarity-electrode-connecting conductor, and the first same-polarity-electrode-connecting conductor may be disposed between the second principal surface and the second same-polarity-electrode-connecting conductor. In this case, when the monolithic ceramic capacitor is surface-mounted on a wiring substrate, the second principal surface is preferably disposed so as to face the wiring substrate.

In this preferred embodiment of the present invention, when the side surfaces include a first side surface and a second side surface facing each other, the first same-polarity-electrode-connecting conductor may be electrically connected to only the first outer electrodes provided on the first side surface. Alternatively, when the side surfaces include a first side surface and a second side surface facing each other, the first same-polarity-electrode-connecting conductor may be electrically connected to the first outer electrodes provided on the first side surface and to the first outer electrodes provided on the second side surface.

According to another preferred embodiment of the present invention, same-polarity-electrode-connecting via conductors are provided instead of the same-polarity-electrode-connecting conductors. More specifically, a monolithic ceramic capacitor according to a preferred embodiment of the present invention includes a first same-polarity-electrode-connecting via conductor which is provided so as to extend the ceramic layers in the thickness direction inside the ceramic laminate and which is electrically connected to the first inner electrodes but is electrically isolated from the second inner electrodes. The monolithic ceramic capacitor also includes a second same-polarity-electrode-connecting via conductor which is provided so as to extend the ceramic layers in the thickness direction inside the ceramic laminate and which is electrically connected to the second inner electrodes but is electrically isolated from the first inner electrodes.

The number of each of the first same-polarity-electrode-connecting via conductors and the number of the second same-polarity-electrode-connecting via conductors is preferably one.

According to preferred embodiments of the present invention, among a plurality of first outer electrodes, at least two of the first outer electrodes are electrically connected via the first same-polarity-electrode-connecting conductor. In addition, among a plurality of second outer electrodes, at least two of the second outer electrodes are electrically connected via the second same-polarity-electrode-connecting conductor. Accordingly, when conductor lands on a wiring substrate are electrically connected to the outer electrodes, with solder therebetween, even when the connection between an outer electrode and the corresponding conductor land is accidentally cut due to, for example, a solder crack, a desired capacitance provided by the monolithic ceramic capacitor is ensured as long as the disconnected outer electrode is electrically connected to another outer electrode via the same-polarity-electrode-connecting conductor. Furthermore, the total capacitance of the monolithic ceramic capacitor can be measured using only one of the at least two outer electrodes connected via the same-polarity-electrode-connecting conductor. That is, all of the outer terminals need not be used for measuring the total capacitance of the monolithic ceramic capacitor. Accordingly, the total capacitance of the monolithic ceramic capacitor can be easily determined.

According to preferred embodiments of the present invention, when the first same-polarity-electrode-connecting conductor is electrically connected to all the first outer electrodes, even when an accident, such as a solder crack, occurs in any of the first outer electrodes, a desired capacitance can be ensured in the monolithic ceramic capacitor. This also applies to the case in which the second same-polarity-electrode-connecting conductor is electrically connected to all the second outer electrodes.

When only a single first same-polarity-electrode-connecting conductor is provided inside the ceramic laminate, the height of the monolithic ceramic capacitor is advantageously decreased. This also applies to the second same-polarity-electrode-connecting conductor.

On the other hand, when a plurality of first same-polarity-electrode-connecting conductors are provided inside the ceramic laminate and these first same-polarity-electrode-connecting conductors are successively disposed in the laminating direction, connection reliability between the first same-polarity-electrode-connecting conductors and the first outer electrodes is improved. This also applies to the second same-polarity-electrode-connecting conductor.

According to preferred embodiments of the present invention, the first same-polarity-electrode-connecting conductor is disposed between the first inner electrode of the first inner electrodes that is disposed closest to the first principal surface of the ceramic laminate, and the first principal surface, the first inner electrode being adjacent to the first same-polarity-electrode-connecting conductor, and the second same-polarity-electrode-connecting conductor is disposed between the second inner electrode of the second inner electrodes that is disposed closest to the second principal surface of the ceramic laminate, and the second principal surface, the second inner electrode being adjacent to the second same-polarity-electrode-connecting conductor. In this case, the first same-polarity-electrode-connecting conductor and the second same-polarity-electrode-connecting conductor do not substantially contribute to the formation of the capacitance. Accordingly, a variation in the capacitance due to the formation of these same-polarity-electrode-connecting conductors is substantially eliminated.

According to preferred embodiments of the present invention, the second same-polarity-electrode-connecting conductor is disposed between the second inner electrode of the second inner electrodes that is disposed closest to the second principal surface of the ceramic laminate, and the second principal surface, the second inner electrode being adjacent to the second same-polarity-electrode-connecting conductor, and the first same-polarity-electrode-connecting conductor is disposed between the second principal surface and the second same-polarity-electrode-connecting conductor. In this case, a very low capacitance is generated between the first same-polarity-electrode-connecting conductor and the second same-polarity-electrode-connecting conductor. This very low capacitance does not significantly affect the total capacitance. Furthermore, in the above case, in mounting the monolithic ceramic capacitor on a wiring substrate, when the second principal surface is disposed so as to face the wiring substrate, the position at which the capacitance between the first same-polarity-electrode-connecting conductor and the second same-polarity-electrode-connecting conductor is generated is close to the wiring substrate side. Accordingly, the loop inductance is decreased, thereby decreasing ESL.

In preferred embodiments of the present invention, when the number of each of the first same-polarity-electrode-connecting via conductors and the number of the second same-polarity-electrode-connecting via conductors is one, the number of the same-polarity-electrode-connecting via conductors is minimized. Consequently, an excessive decrease in ESR is prevented.

Other features, elements, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
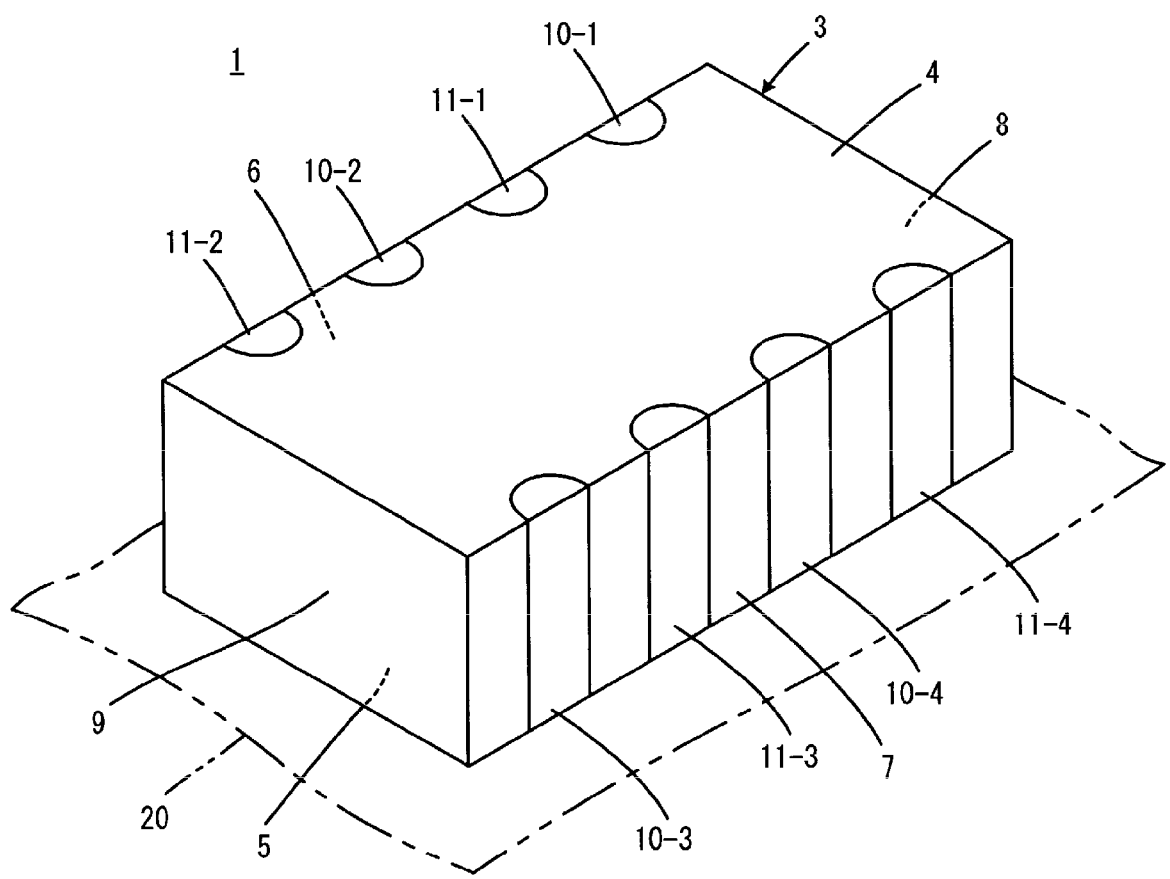
FIG. 1 is a perspective view of a monolithic ceramic capacitor 1 according to a first preferred embodiment of the present invention.
Figure 2:
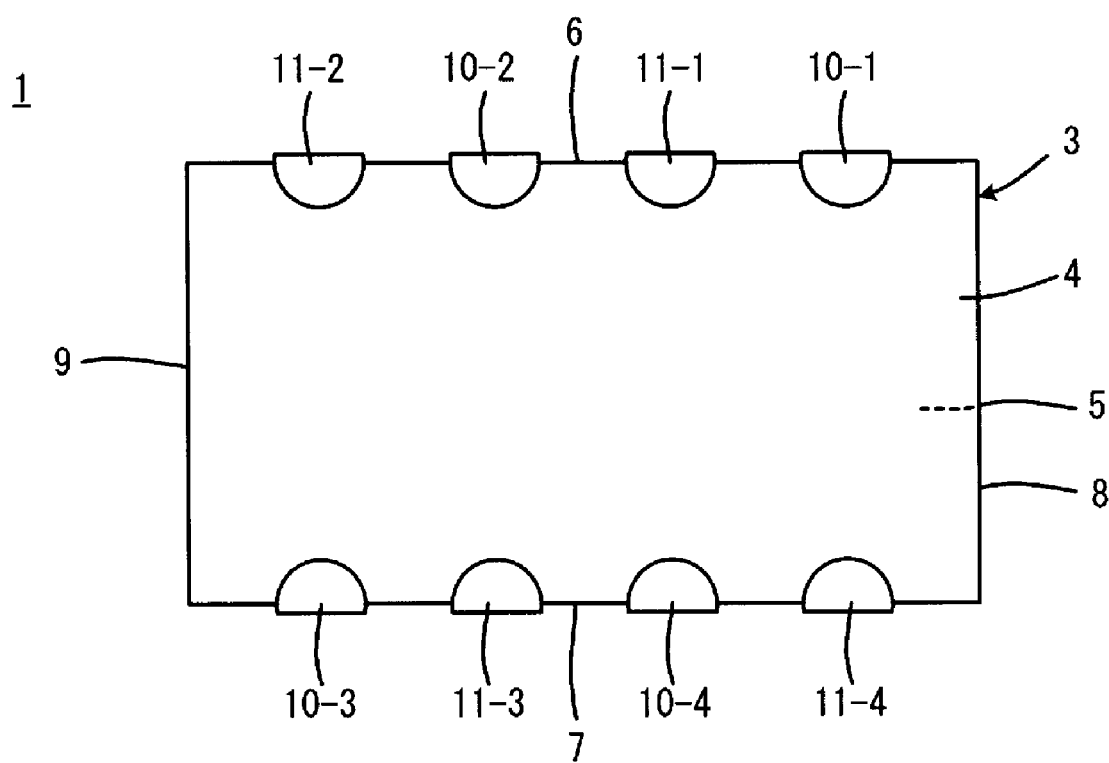
FIG. 2 is a plan view of the monolithic ceramic capacitor 1 shown in FIG. 1.
Figure 3:
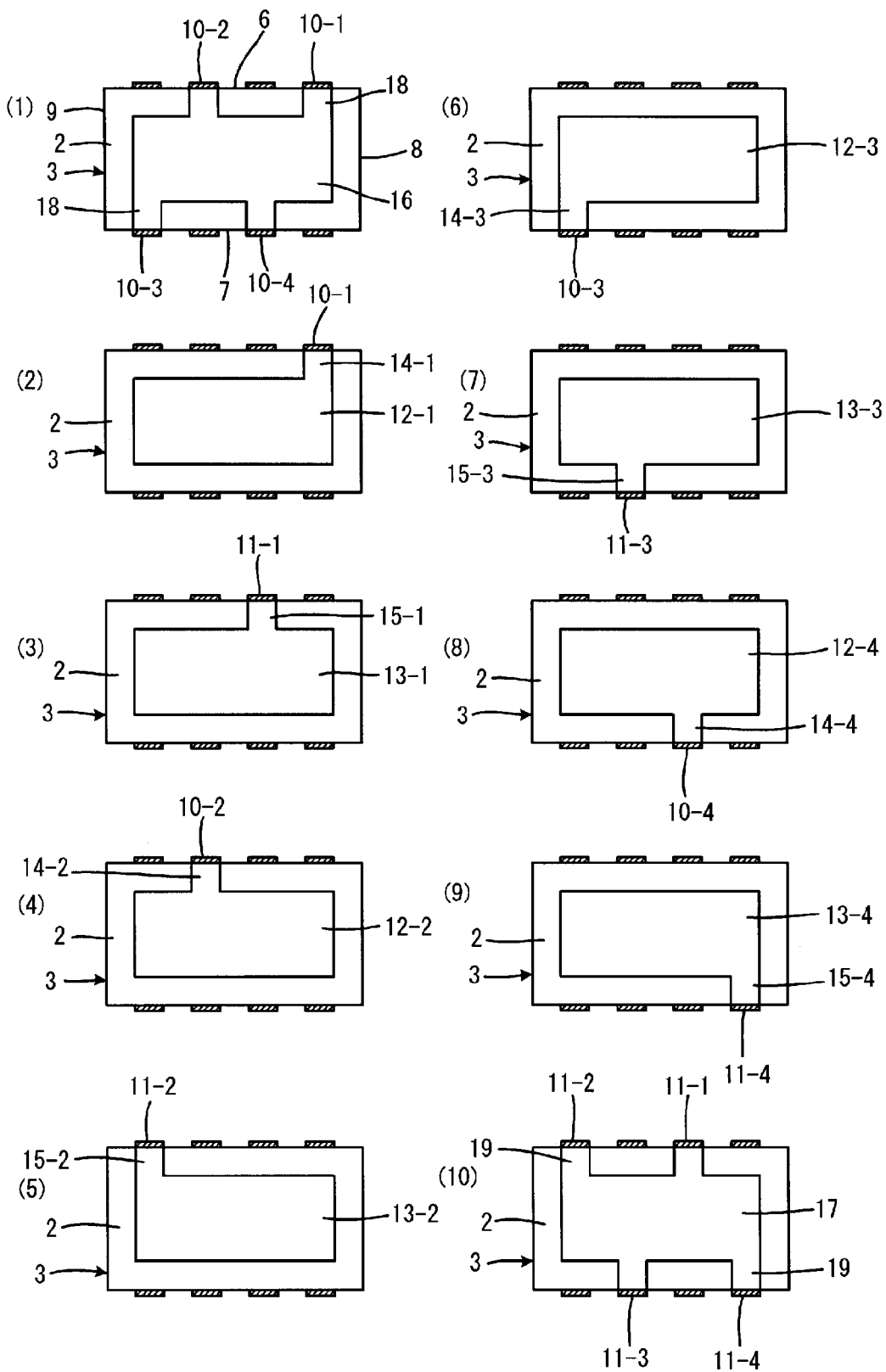
FIGS. 3(1) to 3(10) are plan views showing the inner structure of the monolithic ceramic capacitor 1 shown in FIGS. 1 and 2 using cross sections thereof.
Figure 4:
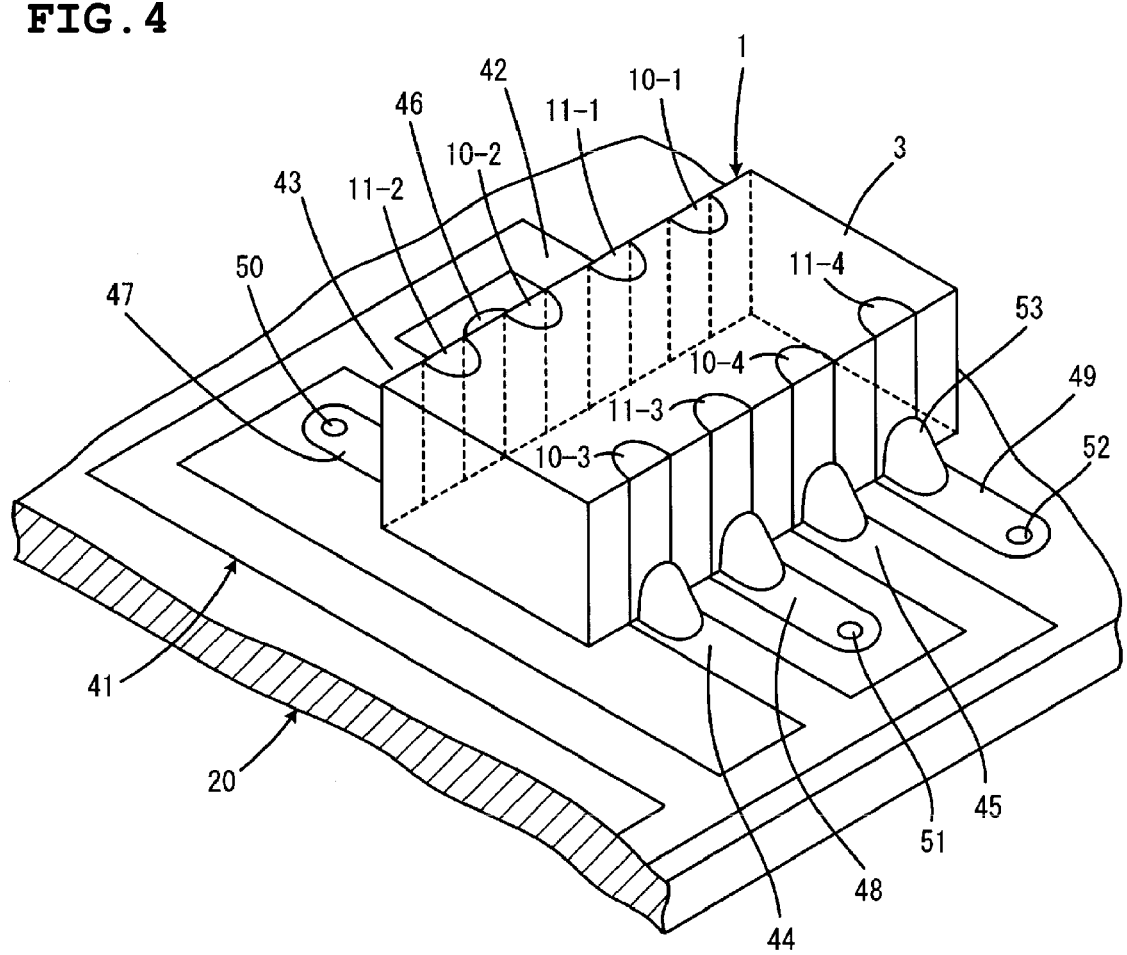
FIG. 4 is a perspective view showing a state in which the monolithic ceramic capacitor 1 shown in FIG. 1 is mounted.

FIG. 1, FIG. 2, FIGS. 3(1) to 3(10), and FIG. 4 illustrate a monolithic ceramic capacitor 1 according to a first preferred embodiment of the present invention. FIG. 1 is a perspective view of the monolithic ceramic capacitor 1. FIG. 2 is a plan view of the monolithic ceramic capacitor 1. FIGS. 3(1) to 3(10) are plan views showing the inner structure of the monolithic ceramic capacitor 1 using cross sections thereof. In FIGS. 3(1) to 3(10), the numbers 1 to 10 also represent the order of lamination from the top. FIG. 4 is a perspective view showing a state in which the monolithic ceramic capacitor 1 shown in FIG. 1 is mounted.

The monolithic ceramic capacitor 1 includes a substantially rectangular parallelepiped-shaped ceramic laminate 3 including a plurality of laminated ceramic layers 2. Each of the ceramic layers 2 is made of, for example, a dielectric ceramic including, as a main component, $BaTiO_3$, $CaTiO_3$, $SrTiO_3$, $CaZrO_3$, or other suitable materials. An auxiliary component such as a Mn compound, an Fe compound, a Cr compound, a Co compound, or a Ni compound may be added to the main component. The thickness of the ceramic layer 2 is, for example, in the range of about 2.0 μm to about 3.0 μm.

The ceramic laminate 3 has a first principal surface 4 and a second principal surface 5 facing the first principal surface 4. The ceramic laminate 3 also has a first side surface 6, a second side surface 7, a third side surface 8, and a fourth side surface 9, which are connected to the periphery of the first principal surface 4 and the periphery of the second principal surface 5. In this ceramic laminate 3, each of the ceramic layers 2 extends in the direction of the principal surfaces 4 and 5. The side surfaces 6 to 9 extend in the laminating direction of the ceramic layers 2. The first side surface 6 faces the second side surface 7. The third side surface 8 faces the fourth side surface 9. The first side surface 6 and the second side surface 7 are disposed along the longer sides of the ceramic layers 2.

A plurality of first outer electrodes 10 and a plurality of second outer electrodes 11 are provided on the side surfaces of the ceramic laminate 3. In this preferred embodiment, four first outer electrodes 10 and four second outer electrodes 11 are provided on the first side surface 6 and the second side surface 7, respectively. A first polarity is assigned to the first outer electrodes 10, and a second polarity is assigned to the second outer electrodes 11. Preferably, the first outer electrodes 10 and the second outer electrodes 11 are alternately arranged.

To distinguish the four first outer electrodes 10 from each other, reference numerals of 10-1, 10-2, 10-3, and 10-4 are used for the first outer electrodes. To distinguish the four second outer electrodes 11 from each other, reference numerals of 11-1, 11-2, 11-3, and 11-4 are used for the second outer electrodes.

Examples of a conductive component of the outer electrodes 10 and 11 include Cu, Ni, Ag, Pd, Ag—Pd alloys, and Au. However, other suitable materials may be used for the outer electrodes 10 and 11. When the monolithic ceramic capacitor 1 is mounted with solder, the outer electrodes 10 and 11 preferably have a structure in which a Ni film and a Sn film are formed by plating on a metal underlayer in that order. When the monolithic ceramic capacitor 1 is mounted on a resin substrate in an embedded manner, the outer electrodes 10 and 11 preferably have a structure in which a Cu film, which has a satisfactory adhesivity to resins, is formed by plating on a metal underlayer. When the monolithic ceramic capacitor 1 is mounted with an electroconductive adhesive, Ag, Pd, or a Ag—Pd alloy is preferably used as the conductive component included in the outer electrodes 10 and 11. When the monolithic ceramic capacitor 1 is mounted by wire bonding, Au is preferably used as the conductive component included in the outer electrodes 10 and 11.

As shown in FIGS. 3(2) to 3(9), a plurality of first inner electrodes 12 and a plurality of second inner electrodes 13 are provided inside the ceramic laminate 3. Examples of a conductive component included in the inner electrodes 12 and 13 include Ni, Cu, Ag, Pd, Ag—Pd alloys, and Au. Each of the inner electrodes 12 and 13 has a thickness in the range of about 0.8 μm to about 1.2 μm.

Each of the first inner electrodes 12 and the second inner electrodes 13 face each other, with the ceramic layer 2 therebetween, so as to form a capacitance between the first inner electrode 12 and the second inner electrode 13. Each of the first inner electrodes 12 is electrically connected to only one of the four first outer electrodes 10. Each of the second inner electrodes 13 is electrically connected to only one of the four second outer electrodes 11.

Four first inner electrodes 12 and four second inner electrodes 13 are shown in FIGS. 3(2) to 3(9). To distinguish the four first inner electrodes 12 from each other, reference numerals of 12-1, 12-2, 12-3, and 12-4 are used for the first inner electrodes. To distinguish the four second inner electrodes 13 from each other, reference numerals of 13-1, 13-2, 13-3, and 13-4 are used for the second inner electrodes.

A specific description will be provided of a preferred embodiment of the connection of each of the first inner electrodes 12 and the second inner electrodes 13 to one of the first outer electrodes 10 and the second outer electrodes 11 with reference to FIGS. 3(2) to 3(9).

As shown in FIG. 3(2), a first inner electrode 12-1 is electrically connected to only a first outer electrode 10-1, with a leading portion 14-1 therebetween. As shown in FIG. 3(4), a first inner electrode 12-2 is electrically connected to only a first outer electrode 10-2, with a leading portion 14-2 therebetween. As shown in FIG. 3(6), a first inner electrode 12-3 is electrically connected to only a first outer electrode 10-3, with a leading portion 14-3 therebetween. As shown in FIG. 3(8), a first inner electrode 12-4 is electrically connected to only a first outer electrode 10-4, with a leading portion 14-4 therebetween.

As shown in FIG. 3(3), a second inner electrode 13-1 is electrically connected to only a second outer electrode 11-1, with a leading portion 15-1 therebetween. As shown in FIG. 3(5), a second inner electrode 13-2 is electrically connected to only a second outer electrode 11-2, with a leading portion 15-2 therebetween. As shown in FIG. 3(7), a second inner electrode 13-3 is electrically connected to only a second outer electrode 11-3, with a leading portion 15-3 therebetween. As shown in FIG. 3(9), a second inner electrode 13-4 is electrically connected to only a second outer electrode 11-4, with a leading portion 15-4 therebetween.

Furthermore, as shown in FIGS. 3(1) and 3(10), a first same-polarity-electrode-connecting conductor 16 and a second same-polarity-electrode-connecting conductor 17 are provided inside the ceramic laminate 3. The first same-polarity-electrode-connecting conductor 16 and the second same-polarity-electrode-connecting conductor 17 define a feature of the present invention. In this preferred embodiment, as shown in FIG. 3(1), the first same-polarity-electrode-connecting conductor 16 is electrically connected to all of the first outer electrodes 10, with leading portions 18 therebetween. As shown in FIG. 3(10), the second same-polarity-electrode-connecting conductor 17 is electrically connected to all of the second outer electrodes 11, with leading portions 19 therebetween.

The same-polarity-electrode-connecting conductors 16 and 17 are preferably made of the same material as the inner electrodes 12 and 13. Each of the same-polarity-electrode-connecting conductors 16 and 17 has a thickness in the range of, for example, about 0.8 μm to about 1.2 μm, which is similar to the thickness of each of the inner electrodes 12 and 13.

As described above, in the ceramic laminate 3, the ceramic layers 2 are laminated in the order of lamination shown in FIGS. 3(1) to 3(10). Although not shown in the figures, a predetermined number of ceramic layers 2 not having the inner electrode or the same-polarity-electrode-connecting conductor are laminated on both ends in the laminating direction of the ceramic laminate 3.

In the lamination structure of the ceramic laminate 3, the lamination period that is sequentially shown in FIGS. 3(2) to 3(9) may be repeated a plurality of times as required.

In FIG. 1, a wiring substrate 20 is indicated by the imaginary line. For example, the monolithic ceramic capacitor 1 is surface-mounted on the wiring substrate 20 so that the second principal surface 5 of the ceramic laminate 3 faces the wiring substrate 20. A specific example of the monolithic ceramic capacitor mounted in this manner will now be described with reference to FIG. 4.

A conductor line 41 is arranged on the wiring substrate 20. Conductor lands 42 to 45 are provided on the conductor line 41. Conductor lands 46 to 49 are provided on the wiring substrate 20. Each of the conductor lands 46 to 49 is electrically connected to a circuit (not shown) inside the wiring substrate 20, with a via conductor therebetween. Via conductors 50, 51, and 52 that are electrically connected to the conductor lands 47, 48, and 49, respectively, are shown in FIG. 4.

When the monolithic ceramic capacitor 1 is mounted on the wiring substrate 20, the first outer electrodes 10-1, 10-2, 10-3, and 10-4 are connected to the conductor lands 42, 43, 44, and 45, respectively, with solder 53 therebetween and fixed on the wiring substrate 20. The second outer electrodes 11-1, 11-2, 11-3, and 11-4 are connected to the conductor lands 46, 47, 48, and 49, respectively, with solder 53 therebetween and fixed on the wiring substrate 20.

All of the first outer electrodes 10-1, 10-2, 10-3, and 10-4 and all of the second outer electrodes 11-1, 11-2, 11-3, and 11-4 are connected to the corresponding conductor lands 42 to 49. In this case, the conductor lands 42 to 45 provided on the common conductor line 41 have the same electric potential. On the other hand, the conductor lands 46 to 49 have an electric potential different from that of the conductor lands 42 to 45. Accordingly, two adjacent outer electrodes, i.e., a first outer electrode 10 and an adjacent second outer electrode 11, are connected to different electric potentials.

In the above-described monolithic ceramic capacitor 1 of the first preferred embodiment, all of the first outer electrodes 10 are electrically connected via the first same-polarity-electrode-connecting conductor 16, and all of the second outer electrodes 11 are electrically connected via the second same-polarity-electrode-connecting conductor 17. Accordingly, for example, when the monolithic ceramic capacitor 1 is surface-mounted on the wiring substrate 20 so that the conductor lands on the wiring substrate 20 are electrically connected to the corresponding outer electrodes 10 and 11, with solder therebetween, even when the connection between a certain outer electrode 10 or 11 and a conductor land is accidentally cut such as due to a solder crack, a desired capacitance is ensured in the monolithic ceramic capacitor 1.

Furthermore, the total capacitance of the monolithic ceramic capacitor 1 can be measured using any one of the first outer electrodes 10 and any one of the second outer electrodes 11. Accordingly, the total capacitance can be easily determined.

According to this preferred embodiment, all of the first outer electrodes 10 can be electrically connected to each other using only a single first same-polarity-electrode-connecting conductor. Therefore, this structure is advantageous in that the height of the monolithic ceramic capacitor 1 is decreased. When this advantage is not desired, a plurality of first same-polarity-electrode-connecting conductors 16 may be provided along the interface between different ceramic layers 2. This also applies to the second same-polarity-electrode-connecting conductor 17.

In the ceramic laminate 3 of this preferred embodiment, as shown in FIGS. 3(1), 3(2), 3(9), and 3(10), the first same-polarity-electrode-connecting conductor 16 is disposed between the first inner electrode 12-1, which, among the first inner electrodes 12-1, 12-2, 12-3, and 12-4, is closest to the first principal surface 4, and the first principal surface 4, and the first inner electrode 12-1 is adjacent to the first same-polarity-electrode-connecting conductor 16. In addition, the second same-polarity-electrode-connecting conductor 17 is disposed between the second inner electrode 13-4, which, among the second inner electrodes 13-1, 13-2, 13-3, and 13-4, is closest to the second principal surface 5, and the second principal surface 5, and the second inner electrode 13-4 is adjacent to the second same-polarity-electrode-connecting conductor 17.

According to the above-described structure, the first same-polarity-electrode-connecting conductor 16 and the second same-polarity-electrode-connecting conductor 17 do not substantially contribute to the formation of the capacitance. Accordingly, a variation in the capacitance due to the formation of these same-polarity-electrode-connecting conductors 16 and 17 is substantially eliminated.

An example of a method of producing the above-described monolithic ceramic capacitor 1 will now be described.

First, ceramic green sheets used as the ceramic layers 2, conductive paste used for the inner electrodes 12 and 13, conductive paste used for the outer electrodes 10 and 11, and conductive paste used for the same-polarity-electrode-connecting conductors 16 and 17 are prepared. In this example, the same conductive paste is used for the inner electrodes 12 and 13 and the same-polarity-electrode-connecting conductors 16 and 17. Any suitable known ceramic green sheets and conductive paste can be used.

Subsequently, the conductive paste is printed on each of the ceramic green sheets by, for example, screen printing so as to have a predetermined pattern. Accordingly, ceramic green sheets having conductive paste films, which are to be formed into the inner electrodes 12 and 13, and the same-polarity-electrode-connecting conductors 16 and 17 are prepared.

The ceramic green sheets each having the conductive paste film thereon are laminated in a predetermined order. A predetermined number of ceramic green sheets for outer layers which not have a conductive paste film are laminated on the top surface and the bottom surface of the resulting laminate, thus preparing an unfired mother laminate. The unfired mother laminate is then compressed by isostatic pressing or other suitable method in the laminating direction as required.

The unfired mother laminate is then cut so as to have a predetermined size. Accordingly, an unfired ceramic laminate 3 is prepared.

The unfired ceramic laminate 3 is then fired. Although the firing temperature depends on the ceramic material included in the ceramic green sheets and the metal material included in the conductive paste films, for example, a temperature in the range of about 900° C. to about 1,300° C. is preferable.

Subsequently, conductive paste is printed on the first side surface 6 and the second side surface 7 of the fired ceramic laminate 3 by screen printing or other suitable method so as to have a predetermined pattern. Thus, conductive paste films for the outer electrodes 10 and 11 are formed. These conductive paste films are preferably formed so as to extend from the side surface 6 or 7 to a portion of each of the principal surfaces 4 and 5.

The conductive paste films are then baked to form the outer electrodes 10 and 11. For example, a temperature in the range of about 700° C. to about 900° C. is selected for the baking temperature. An atmosphere such as air, $N_2$, or water vapor+$N_2$ is appropriately selected as the atmosphere during baking in accordance with the type of metal included in the conductive paste.

Thus, the monolithic ceramic capacitor 1 is completed. A plating film may be formed on the surfaces of the outer electrodes 10 and 11 according to need.

Figure 5:
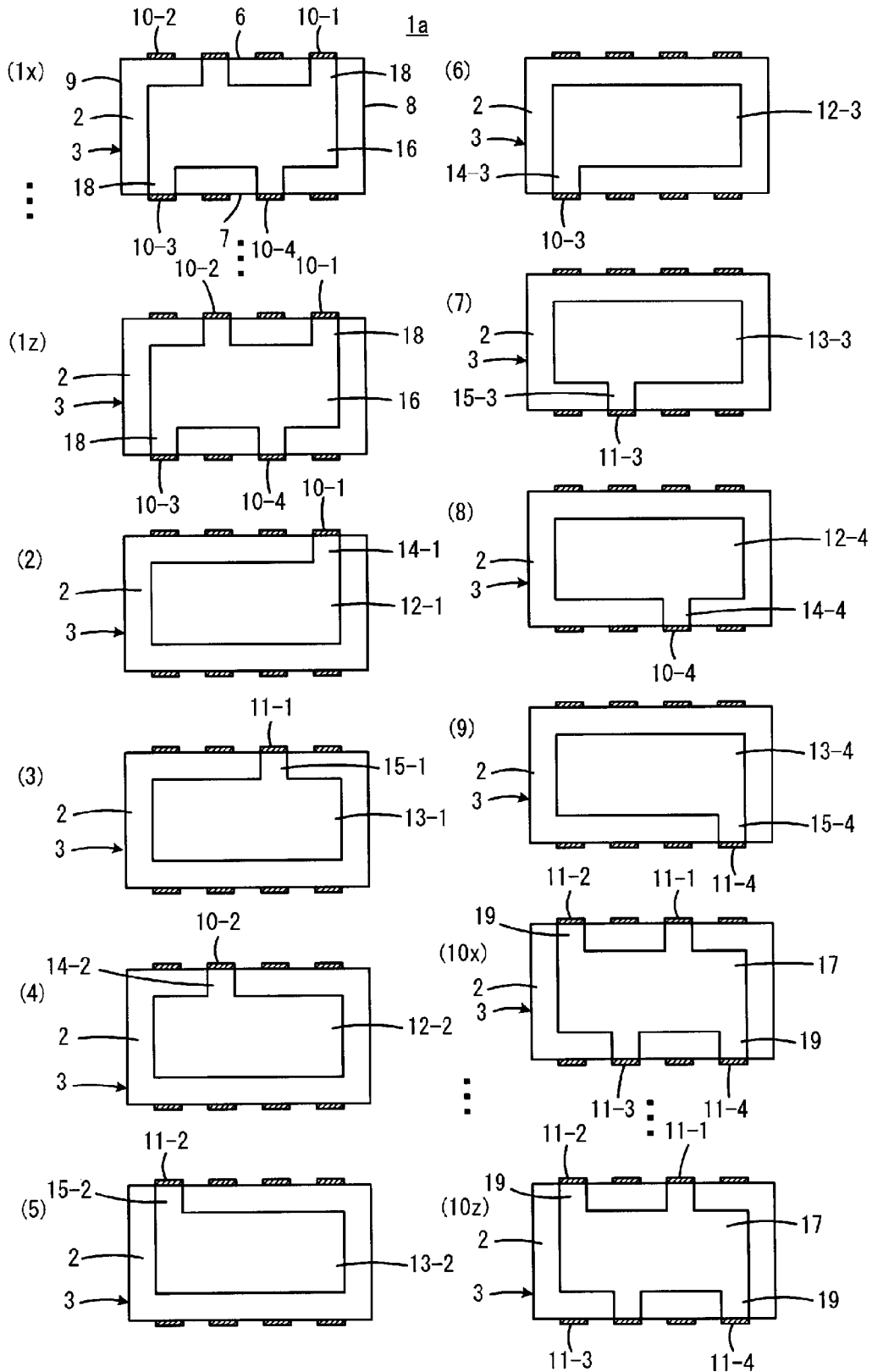
FIGS. 5(1x) to 5(10z) are views illustrating a monolithic ceramic capacitor 1a according to a second preferred embodiment of the present invention and corresponding to FIGS. 3(1) to 3(10).

FIGS. 5(1x) to 5(10z) are views illustrating a monolithic ceramic capacitor 1a according to a second preferred embodiment of the present invention, each corresponding to one of FIGS. 3(1) to 3(10). In FIGS. 5(1x) to 5(10z), elements corresponding to those shown in FIGS. 3(1) to 3(10) are assigned the same reference numerals, and a description of those common elements is omitted.

In FIGS. 5(1x) to 5(1z), 5(2) to 5(9), and 5(10x) to 5(10z), the numbers 1x to 1z, 2 to 9, and 10x to 10z also represent the order of lamination from the top. The first same-polarity-electrode-connecting conductor 16 shown in FIG. 5(1x) and the first same-polarity-electrode-connecting conductor 16 shown in FIG. 5(1z) have the same pattern. In the figures, the expression "1x . . . 1z" represents a plurality of first same-polarity-electrode-connecting conductors 16 that have the same pattern and are successively laminated. Similarly, the second same-polarity-electrode-connecting conductor 17 shown in FIG. 5(10x) and the second same-polarity-electrode-connecting conductor 17 shown in FIG. 5(10z) have the same pattern. In the figures, the expression "10x . . . 10z" represents a plurality of second same-polarity-electrode-connecting conductors 17 that have the same pattern and are successively laminated.

As described above, a plurality of first same-polarity-electrode-connecting conductors 16 are successively disposed in the laminating direction, and a plurality of second same-polarity-electrode-connecting conductors 17 are successively disposed in the laminating direction inside the ceramic laminate 3. This structure improves both connection reliability between the first same-polarity-electrode-connecting conductors 16 and the first outer electrodes 10 and connection reliability between the second same-polarity-electrode-connecting conductors 17 and the second outer electrodes 11. Accordingly, backup in the case of disconnection is more reliably achieved.

Preferably, for example, about 3 to 10 first same-polarity-electrode-connecting conductors 16 and about 3 to 10 second same-polarity-electrode-connecting conductors 17 are successively disposed in the laminating direction.

Other structures are the same as those in the first preferred embodiment shown in FIGS. 3(1) to 3(10). The lamination period that is sequentially shown in FIGS. 5(2) to 5(9) may be repeated a plurality of times.

Figure 6:
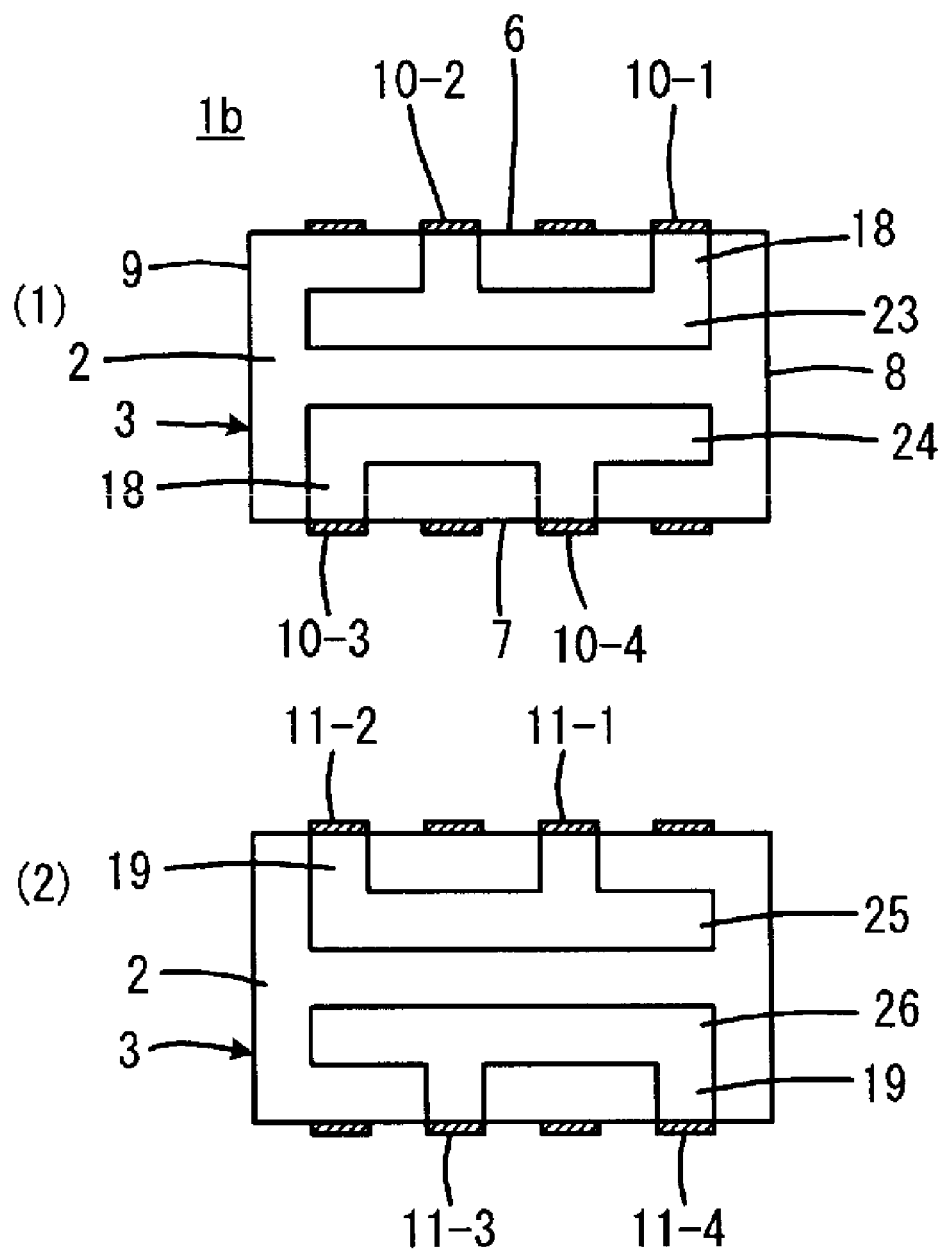
FIGS. 6(1) and 6(2) are views illustrating a monolithic ceramic capacitor 1b according to a third preferred embodiment of the present invention and corresponding to respective ones of FIGS. 3(1) and 3(10).

FIGS. 6(1) and 6(2) are views illustrating a monolithic ceramic capacitor 1b according to a third preferred embodiment of the present invention and corresponding to FIGS. 3(1) and 3(10), respectively. In FIGS. 6(1) and 6(2), elements corresponding to those shown in FIGS. 3(1) and 3(10) are assigned the same reference numerals, and a description of those common elements is omitted.

The monolithic ceramic capacitor 1b of the third preferred embodiment has the same appearance as the monolithic ceramic capacitor 1 of the above-described first preferred embodiment. More specifically, the monolithic ceramic capacitor 1b has an appearance shown in FIGS. 1 and 2. This also applies to monolithic ceramic capacitors according to other preferred embodiments described below.

Referring to FIG. 6(1), two first same-polarity-electrode-connecting conductors 23 and 24 are provided. The first same-polarity-electrode-connecting conductor 23 is electrically connected to the first outer electrodes 10-1 and 10-2. The first same-polarity-electrode-connecting conductor 24 is electrically connected to the remaining first outer electrodes 10-3 and 10-4.

Referring to FIG. 6(2), two second same-polarity-electrode-connecting conductors 25 and 26 are provided. The second same-polarity-electrode-connecting conductor 25 is electrically connected to the second outer electrodes 11-1 and 11-2. The second same-polarity-electrode-connecting conductor 26 is electrically connected to the remaining second outer electrodes 11-3 and 11-4.

The monolithic ceramic capacitor 1b is defined by replacing the first same-polarity-electrode-connecting conductor 16 shown in FIG. 3(1) with the first same-polarity-electrode-connecting conductors 23 and 24, and replacing the second same-polarity-electrode-connecting conductor 17 shown in FIG. 3(10) with the second same-polarity-electrode-connecting conductors 25 and 26.

According to a feature of the monolithic ceramic capacitor 1b of the third preferred embodiment, the first same-polarity-electrode-connecting conductor 23 is electrically connected to only the first outer electrodes 10-1 and 10-2 provided on the first side surface 6, and the first same-polarity-electrode-connecting conductor 24 is electrically connected to only the first outer electrodes 10-3 and 10-4 provided on the second side surface 7. Furthermore, the second same-polarity-electrode-connecting conductor 25 is electrically connected to only the second outer electrodes 11-1 and 11-2 provided on the first side surface 6, and the second same-polarity-electrode-connecting conductor 26 is electrically connected to only the second outer electrodes 11-3 and 11-4 provided on the second side surface 7.

Figure 7:
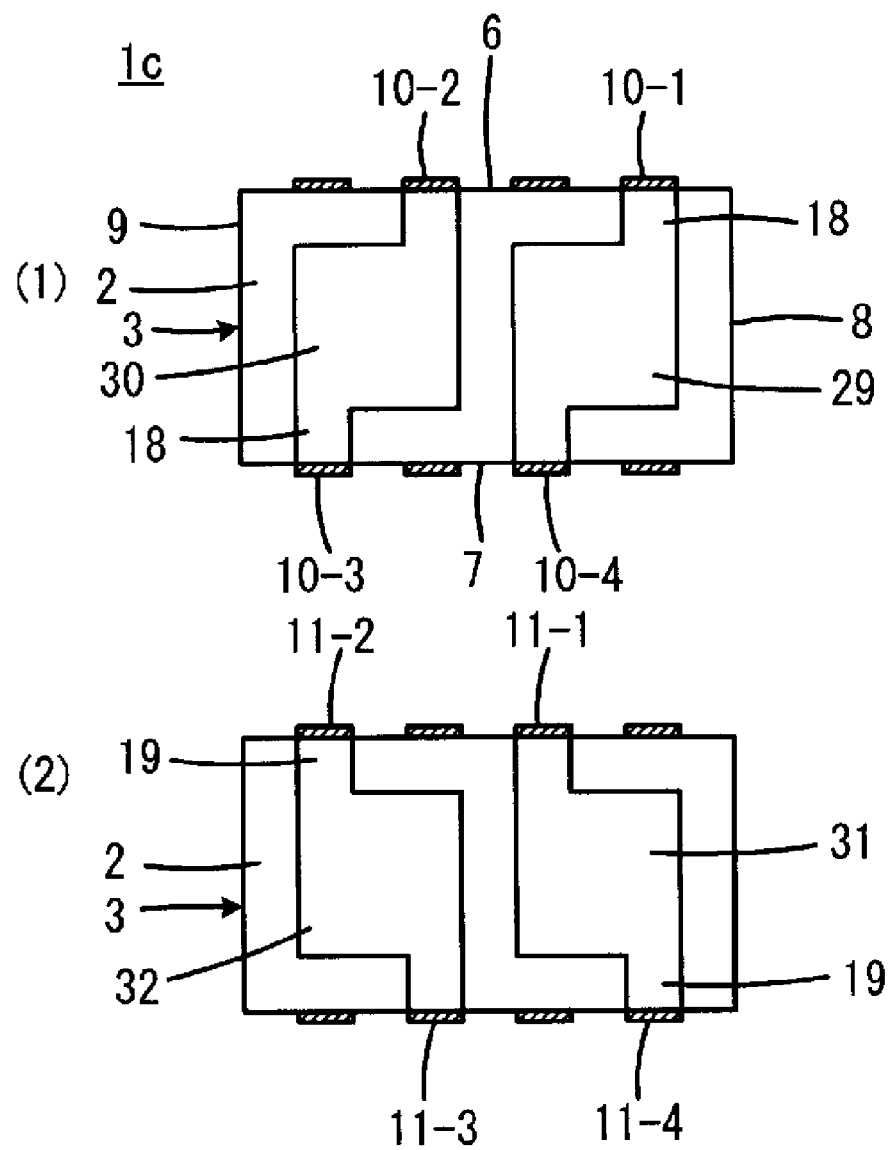
FIGS. 7(1) and 7(2) are views illustrating a monolithic ceramic capacitor 1c according to a fourth preferred embodiment of the present invention and corresponding to respective ones of FIGS. 3(1) and 3(10).

FIGS. 7(1) and 7(2) are views illustrating a monolithic ceramic capacitor 1c according to a fourth preferred embodiment of the present invention and corresponding to FIGS. 3(1) and 3(10) or FIGS. 6(1) and 6(2), respectively. In FIGS. 7(1) and 7(2), elements corresponding to those shown in FIGS. 3(1) and 3(10), or FIGS. 6(1) and 6(2) are assigned the same reference numerals, and a description of those common elements is omitted.

Referring to FIG. 7(1), two first same-polarity-electrode-connecting conductors 29 and 30 are provided. The first same-polarity-electrode-connecting conductor 29 is electrically connected to the first outer electrodes 10-1 and 10-4. The first same-polarity-electrode-connecting conductor 30 is electrically connected to the remaining first outer electrodes 10-2 and 10-3.

Referring to FIG. 7(2), two second same-polarity-electrode-connecting conductors 31 and 32 are provided. The second same-polarity-electrode-connecting conductor 31 is electrically connected to the second outer electrodes 11-1 and 11-4. The second same-polarity-electrode-connecting conductor 32 is electrically connected to the remaining second outer electrodes 11-2 and 11-3.

The monolithic ceramic capacitor 1c is defined by replacing the first same-polarity-electrode-connecting conductor 16 shown in FIG. 3(1) with the first same-polarity-electrode-connecting conductors 29 and 30, and replacing the second same-polarity-electrode-connecting conductor 17 shown in FIG. 3(10) with the second same-polarity-electrode-connecting conductors 31 and 32.

According to a feature of the monolithic ceramic capacitor 1c, the first same-polarity-electrode-connecting conductor 29 is electrically connected to the first outer electrode 10-1 provided on the first side surface 6 and the first outer electrode 10-4 provided on the second side surface 7, and the first same-polarity-electrode-connecting conductor 30 is electrically connected to the first outer electrode 10-2 provided on the first side surface 6 and the first outer electrode 10-3 provided on the second side surface 7. Furthermore, the second same-polarity-electrode-connecting conductor 31 is electrically connected to the second outer electrode 11-1 provided on the first side surface 6 and the second outer electrode 11-4 provided on the second side surface 7, and the second same-polarity-electrode-connecting conductor 32 is electrically connected to the second outer electrode 11-2 provided on the first side surface 6 and the second outer electrode 11-3 provided on the second side surface 7.

Figure 8:
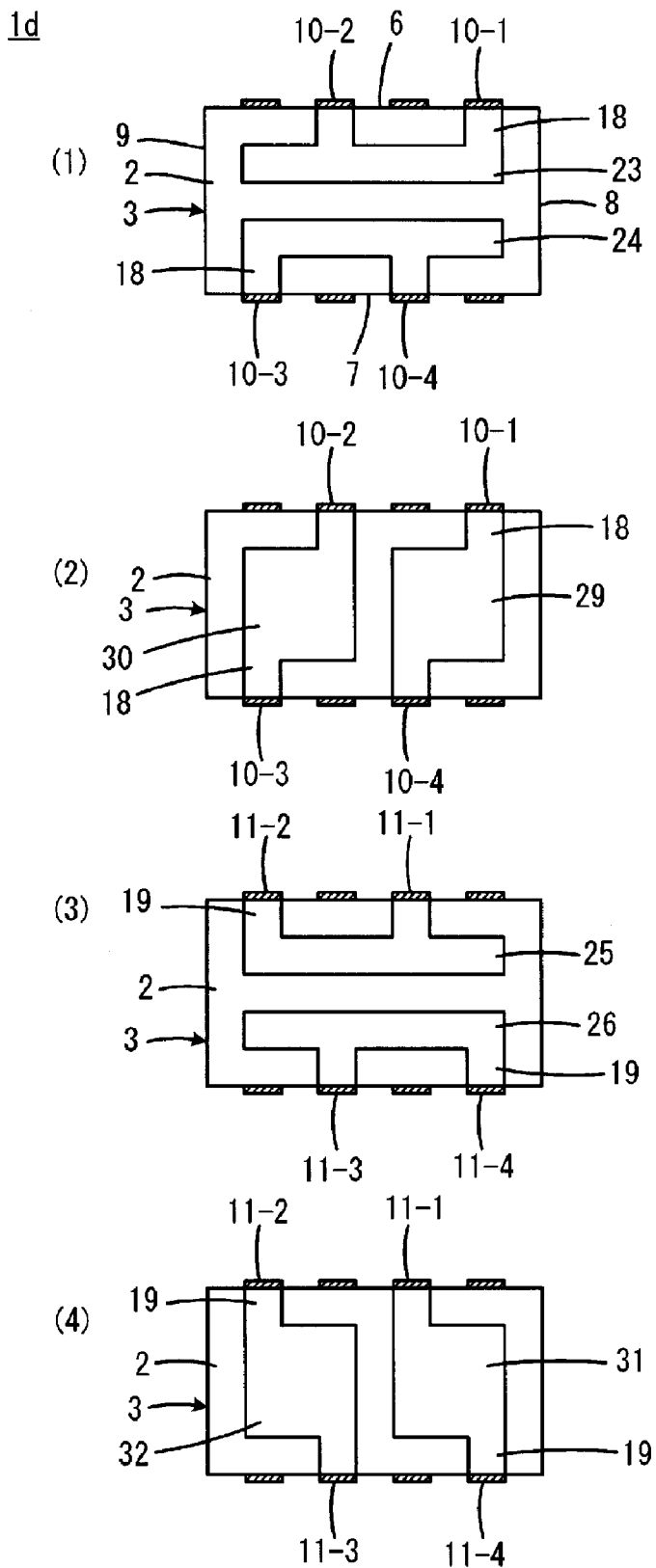
FIGS. 8(1) to 8(4) are views illustrating a monolithic ceramic capacitor 1d according to a fifth preferred embodiment of the present invention and corresponding to respective ones of FIG. 3(1) to 3(10).

FIGS. 8(1) to 8(4) are views illustrating a monolithic ceramic capacitor 1d according to a fifth preferred embodiment of the present invention and each corresponding to at least one of FIGS. 3(1) and 3(10), FIGS. 6(1) and 6(2), and FIGS. 7(1) and 7(2). In FIGS. 8(1) to 8(4), elements corresponding to those shown in FIGS. 3(1) and 3(10), FIGS. 6(1) and 6(2), or FIGS. 7(1) and 7(2) are assigned the same reference numerals, and a description of those common elements is omitted.

The first same-polarity-electrode-connecting conductors 23 and 24 that are the same as those in FIG. 6(1) are shown in FIG. 8(1). The first same-polarity-electrode-connecting conductors 29 and 30 that are the same as those in FIG. 7(1) are shown in FIG. 8(2). The second same-polarity-electrode-connecting conductors 25 and 26 that are the same as those in FIG. 6(2) are shown in FIG. 8(3). The second same-polarity-electrode-connecting conductors 31 and 32 that are the same as those in FIG. 7(2) are shown in FIG. 8(4).

The monolithic ceramic capacitor 1*d* is defined by replacing the first same-polarity-electrode-connecting conductor 16 shown in FIG. 3(1) with the four first same-polarity-electrode-connecting conductors 23, 24, 29, and 30 and replacing the second same-polarity-electrode-connecting conductor 17 shown in FIG. 3(10) with the four second same-polarity-electrode-connecting conductors 25, 26, 31, and 32.

In the monolithic ceramic capacitor 1*d* shown in FIGS. 8(1) to 8(4), all of the first outer electrodes 10-1 to 10-4 are electrically connected to each other by the cooperation of the four first same-polarity-electrode-connecting conductors 23, 24, 29, and 30. Furthermore, all of the second outer electrodes 11-1 to 11-4 are electrically connected to each other by the cooperation of the four second same-polarity-electrode-connecting conductors 25, 26, 31, and 32.

In a modification of the fifth preferred embodiment, any one of the four first same-polarity-electrode-connecting conductors 23, 24, 29, and 30 may be omitted, and any one of the four second same-polarity-electrode-connecting conductors 25, 26, 31, and 32 may be omitted.

Figure 9:
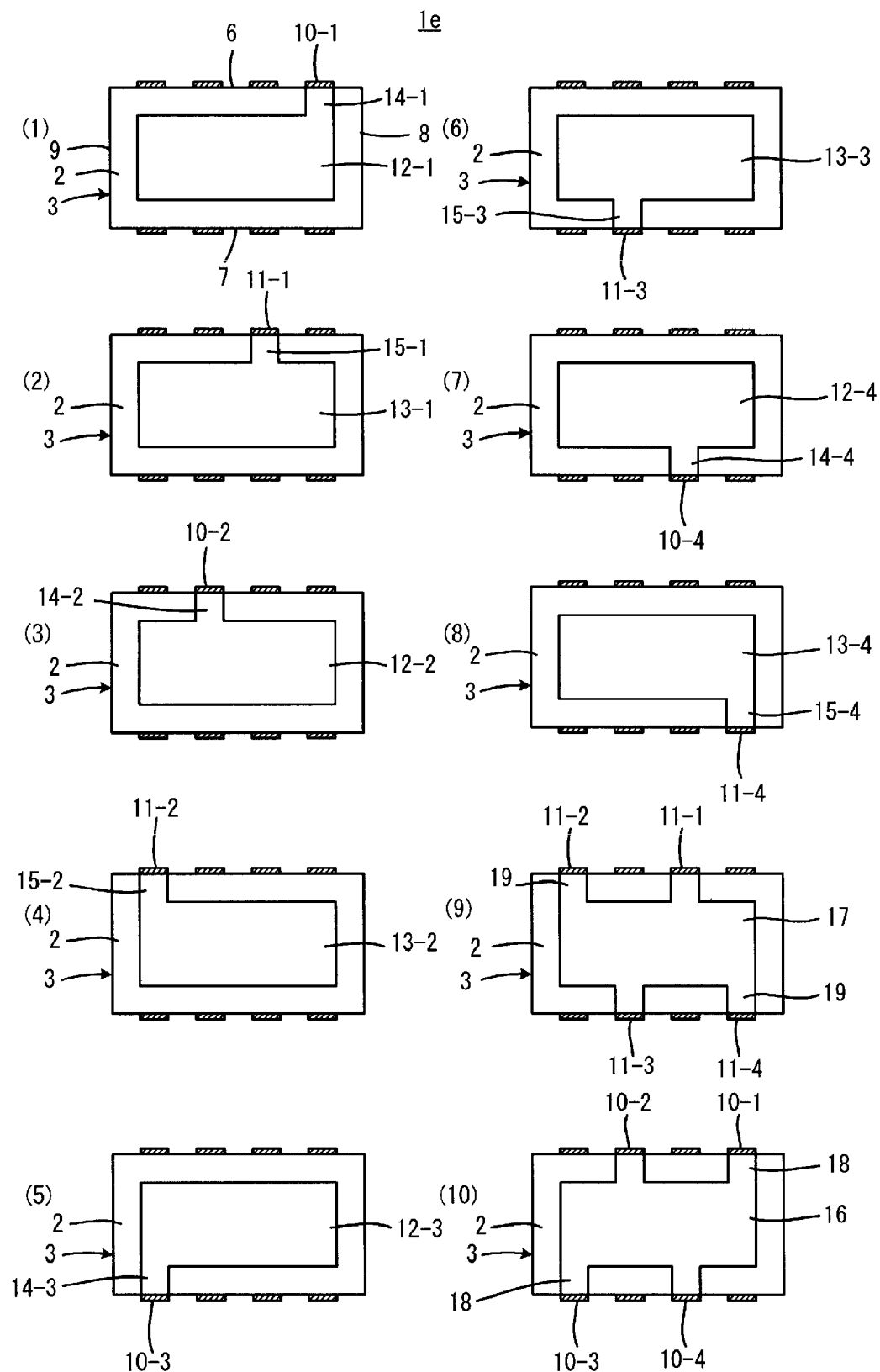
FIGS. 9(1) to 9(10) are views illustrating a monolithic ceramic capacitor 1e according to a sixth preferred embodiment of the present invention and corresponding to FIGS. 3(1) to 3(10).

FIGS. 9(1) to 9(10) are views illustrating a monolithic ceramic capacitor 1*e* according to a sixth preferred embodiment of the present invention and each corresponding to one of FIGS. 3(1) to 3(10). In FIGS. 9(1) to 9(10), elements corresponding to those shown in FIGS. 3(1) and 3(10) are assigned the same reference numerals, and a description of those common elements is omitted.

In FIGS. 9(1) to 9(10), the numbers 1 to 10 also represent the order of lamination from the top. As is apparent from the comparison between the order of lamination shown in FIGS. 9(1) to 9(10) and the order of lamination shown in FIGS. 3(1) to 3(10), in the monolithic ceramic capacitor 1*e* of the sixth preferred embodiment, the first same-polarity-electrode-connecting conductor 16 is laminated outside the second same-polarity-electrode-connecting conductor 17. Other structures are the same as those in the first preferred embodiment shown in FIGS. 3(1) to 3(10). The lamination period that is sequentially shown in FIGS. 9(1) to 9(8) may be repeated a plurality of times.

In the monolithic ceramic capacitor 1*e* of the sixth preferred embodiment, the second same-polarity-electrode-connecting conductor 17 is disposed between the second inner electrode 13-4, which, among the second inner electrodes 13-1, 13-2, 13-3, and 13-4, is closest to the second principal surface 5 (see FIG. 1) of the ceramic laminate 3, and the second principal surface 5. The second inner electrode 13-4 is adjacent to the second same-polarity-electrode-connecting conductor 17. In addition, the first same-polarity-electrode-connecting conductor 16 is disposed between the second principal surface 5 and the second same-polarity-electrode-connecting conductor 17.

In this monolithic ceramic capacitor 1*e*, a very low capacitance is generated between the first same-polarity-electrode-connecting conductor 16 and the second same-polarity-electrode-connecting conductor 17. Here, as shown in FIG. 1, when the second principal surface 5 is disposed so as to face the wiring substrate 20, in the monolithic ceramic capacitor 1*e*, an inner electrode having a large number of current paths is disposed at a position which is close to the wiring substrate 20 and at which the loop inductance is the minimum. Consequently, the ESL of the monolithic ceramic capacitor 1*e* is decreased.

Figure 10:
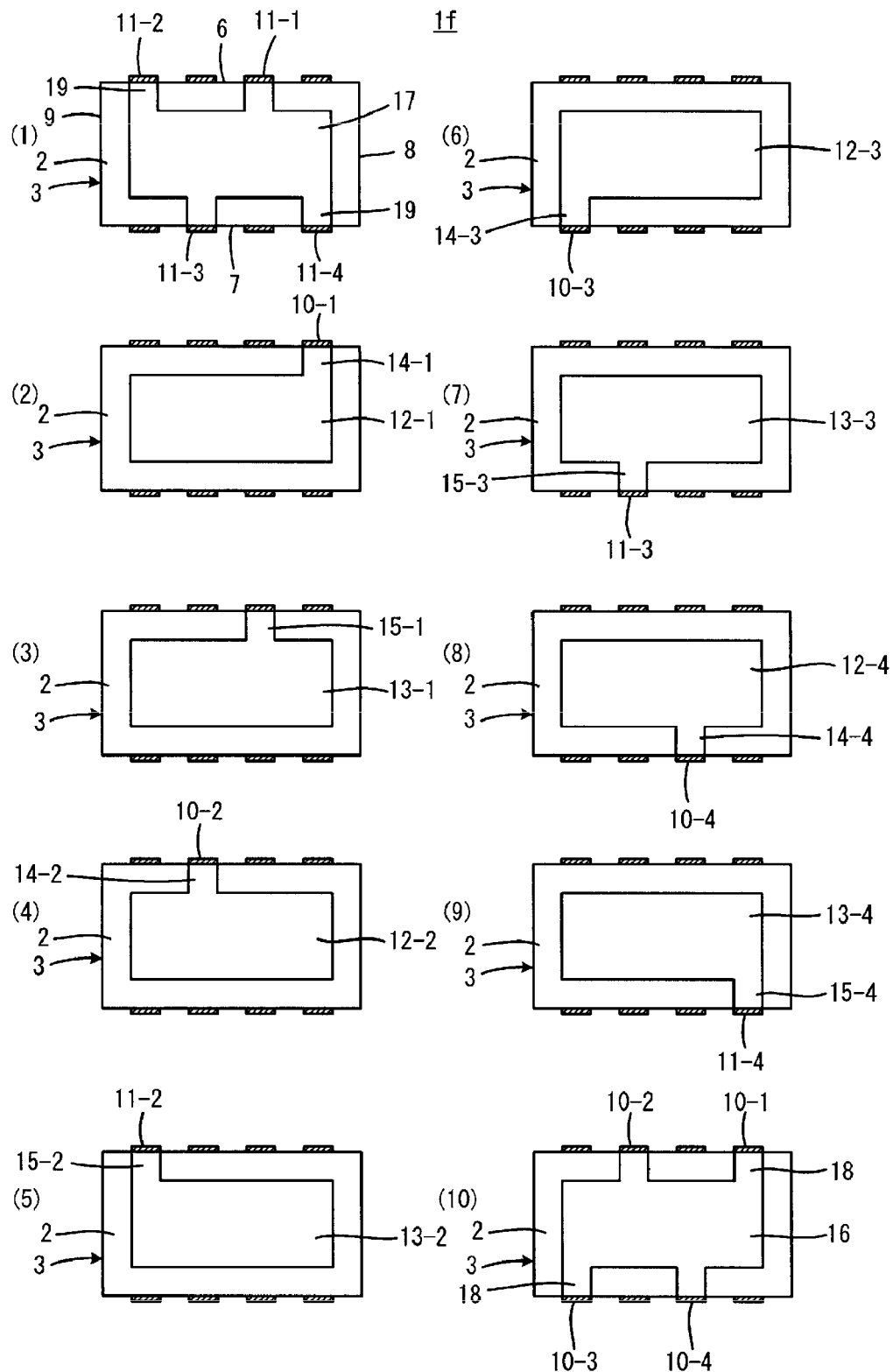
FIGS. 10(1) to 10(10) are views illustrating a monolithic ceramic capacitor 1f according to a seventh preferred embodiment of the present invention and corresponding to FIGS. 3(1) to 3(10).

FIGS. 10(1) to 10(10) are views illustrating a monolithic ceramic capacitor 1*f* according to a seventh preferred embodiment of the present invention and corresponding to FIGS. 3(1) to 3(10), respectively. In FIGS. 10(1) to 10(10), elements corresponding to those shown in FIGS. 3(1) to 3(10) are assigned the same reference numerals, and a description of those common elements is omitted.

In FIGS. 10(1) to 10(10), the numbers 1 to 10 also represent the order of lamination from the top. As is apparent from the comparison between FIGS. 10(1) to 10(10) and FIGS. 3(1) to 3(10), as shown in FIGS. 10(10) and 10(1), in the monolithic ceramic capacitor 1*f* of this preferred embodiment, the laminating positions of the first same-polarity-electrode-connecting conductor 16 and the second same-polarity-electrode-connecting conductor 17 are reverse to those in the monolithic ceramic capacitor 1 shown in FIGS. 3(1) to 3(10). Other structures are the same as those in the monolithic ceramic capacitor 1 shown in FIGS. 3(1) to 3(10). The lamination period that is sequentially shown in FIGS. 10(2) to 10(9) may be repeated a plurality of times.

In the monolithic ceramic capacitor 1*f* shown in FIGS. 10(1) to 10(10), very low capacitances are generated between the first inner electrode 12-1 and the second same-polarity-electrode-connecting conductor 17, and between the second inner electrode 13-4 and the first same-polarity-electrode-connecting conductor 16. Here, as shown in FIG. 1, when the monolithic ceramic capacitor 1*f* is mounted on the wiring substrate 20, when either the first principal surface 4 or the second principal surface 5 of the ceramic laminate 3 is disposed so as to face the wiring substrate 20, in the monolithic ceramic capacitor 1*f*, an inner electrode having a large number of current paths is disposed at a position which is close to the wiring substrate 20 and at which the loop inductance is the minimum. Consequently, the ESL of the monolithic ceramic capacitor 1*f* is decreased.

Figure 11:
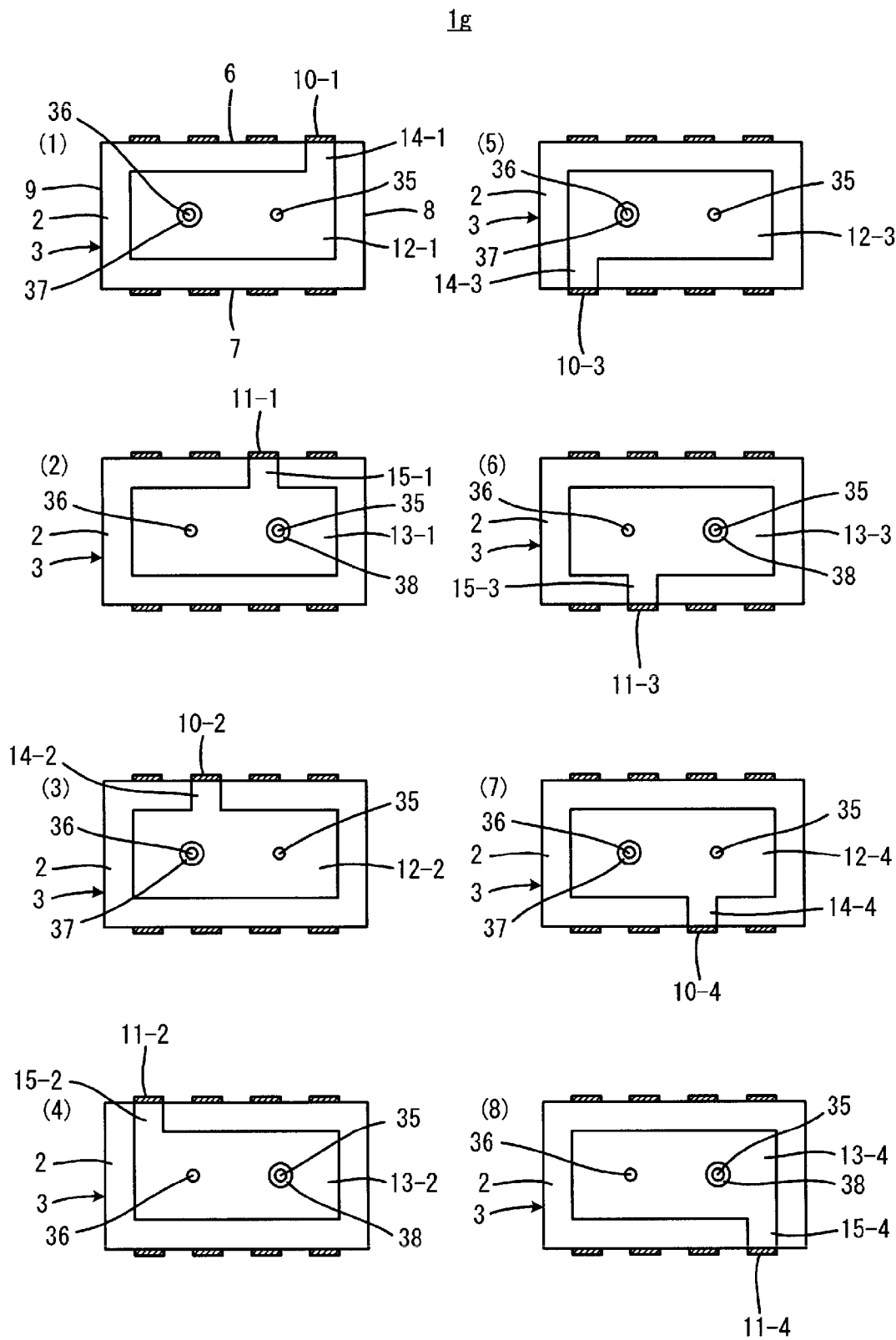
FIGS. 11(1) to 11(8) are views illustrating a monolithic ceramic capacitor 1g according to an eighth preferred embodiment of the present invention and corresponding to respective ones of FIGS. 3(1) to 3(10).

FIGS. 11(1) to 11(8) are views illustrating a monolithic ceramic capacitor 1*g* according to an eighth preferred embodiment of the present invention and corresponding to FIGS. 3(1) to 3(10). In FIGS. 11(1) to 11(8), elements corresponding to those shown in FIGS. 3(1) and 3(10) are assigned the same reference numerals, and a description of those common elements is omitted. In FIGS. 11(1) to 11(8), the numbers 1 to 8 also represent the order of lamination from the top.

In the monolithic ceramic capacitor 1*g* according to the eighth preferred embodiment shown in FIGS. 11(1) to 11(8), the monolithic ceramic capacitor 1*g* does not include the first and second same-polarity-electrode-connecting conductors, but instead, includes a first same-polarity-electrode-connecting via conductor 35 and a second same-polarity-electrode-connecting via conductor 36. In this preferred embodiment, since the monolithic ceramic capacitor 1*g* does not include the first and second same-polarity-electrode-connecting conductors, the number of laminations of the ceramic layers 2 is decreased accordingly. As a result, the height of the monolithic ceramic capacitor 1*g* is decreased.

The first same-polarity-electrode-connecting via conductor 35 and the second same-polarity-electrode-connecting via conductor 36 are arranged so as to extend the ceramic layers 2 in the thickness direction inside the ceramic laminate 3. The first same-polarity-electrode-connecting via conductor 35 is electrically connected to the first inner electrodes 12 but is electrically isolated from the second inner electrodes 13. In contrast, the second same-polarity-electrode-connecting via conductor 36 is electrically connected to the second inner electrodes 13 but is electrically isolated from the first inner electrodes 12. The lamination period that is sequentially shown in FIGS. 11(1) to 11(8) may be repeated a plurality of times.

As in the above-described preferred embodiments, although not shown in the figures, a predetermined number of ceramic layers 2 not having the inner electrode or the same-polarity-electrode-connecting conductor are laminated on both ends in the laminating direction of the ceramic laminate 3. In the preferred embodiment shown in FIGS. 11(1) to 11(8), since these ceramic layers 2 are laminated on both ends in the laminating direction, the same-polarity-electrode-connecting via conductors 35 and 36 are not exposed on the principal surfaces 4 and 5 (see FIG. 1) of the ceramic laminate 3.

Examples of a conductive component included in the same-polarity-electrode-connecting via conductors 35 and 36 include metals such as Ni, Cu, Ag, Pd, Ag—Pd alloys, and Au. The metal included in the same-polarity-electrode-connecting via conductors 35 and 36 as a main component is preferably the same as the metal included in the inner electrodes 12 and 13 as a main component.

The diameter of the same-polarity-electrode-connecting via conductors 35 and 36 after firing is preferably in the range of about 10 μm to about 150 μm. In order to prevent an excessive decrease in ESR of the monolithic ceramic capacitor 1g, the diameter of the same-polarity-electrode-connecting via conductors 35 and 36 is preferably reduced as much as possible. More specifically, the diameter of the same-polarity-electrode-connecting via conductors 35 and 36 is preferably in the range of about 10 μm to about 40 μm.

In the preferred embodiment shown in FIGS. 11(1) to 11(8), a single first same-polarity-electrode-connecting via conductor 35 and a single second same-polarity-electrode-connecting via conductor 36 are provided. In this manner, when the number of each of the first same-polarity-electrode-connecting via conductors 35 and the second same-polarity-electrode-connecting via conductors 36 is one, the number of current paths is minimized. This structure prevents ESR from being excessively decreased.

The monolithic ceramic capacitor 1g shown in FIGS. 11(1) to 11(8) can be produced by the method of producing the above-described monolithic ceramic capacitor 1 except for the following.

First, in producing the monolithic ceramic capacitor 1g, when a conductive paste film that is to be formed into the first inner electrode 12 is printed, a gap 37 is formed between the conductive paste film and the second same-polarity-electrode-connecting via conductor 36. When a conductive paste film that is to be formed into the second inner electrode 13 is printed, a gap 38 is formed between the conductive paste film and the first same-polarity-electrode-connecting via conductor 35.

In addition, after an unfired mother laminate is prepared, a predetermined number of through-holes penetrating the mother laminate in the laminating direction are formed at predetermined positions with a laser or NC punching. The through-holes are then filled with conductive paste by screen printing or other suitable method. In this step, the principal surface of the mother laminate is preferably covered with a mask so as to prevent the conductive paste from being printed on areas other than the through-holes.

Other processes are substantially the same as those in the monolithic ceramic capacitor 1 of the first preferred embodiment.

A description of experimental examples will be provided to confirm the advantages of the present invention, i.e., for confirming that the total capacitance provided by a monolithic ceramic capacitor can be extracted by combinations of any of first outer electrodes and any of second outer electrodes.

As described in detail below, in these experimental examples, monolithic ceramic capacitors according to Examples 1, 2, and 3, which were within the scope of the present invention, were prepared. Furthermore, a monolithic ceramic capacitor according to a comparative example, which was outside the scope of the present invention, was also prepared.

The monolithic ceramic capacitor according to Example 1 had a structure substantially the same as that of the monolithic ceramic capacitor 1 of the first preferred embodiment described with reference to FIG. 1, FIG. 2, and FIGS. 3(1) to 3(10). In the monolithic ceramic capacitor of Example 1, the thickness of each ceramic layer was about 2.0 μm, the thickness of each inner electrode was about 1.0 μm, the thickness of each same-polarity-electrode-connecting conductor was about 1.0 μm, the width of each leading portion of the inner electrodes and the same-polarity-electrode-connecting conductors was about 120 μm, and the thickness of outer layers was about 80 μm. The lamination period shown in FIGS. 3(2) to 3(9) was repeated 14 times. The target dimensions of the monolithic ceramic capacitor were about 1.60 mm×about 0.80 mm×about 0.50 mm.

The monolithic ceramic capacitor according to Example 2 had a structure substantially the same as that of the monolithic ceramic capacitor 1d of the fifth preferred embodiment described with reference to FIGS. 8(1) to 8(4). In this monolithic ceramic capacitor of Example 2, the thickness of each ceramic layer was about 2.0 μm, the thickness of each inner electrode was about 1.0 μm, the thickness of each same-polarity-electrode-connecting conductor was about 1.0 μm, the width of each leading portion of the inner electrodes and the same-polarity-electrode-connecting conductors was about 120 μm, and the thickness of outer layers was about 80 μm. The lamination period shown in FIGS. 3(2) to 3(9) was repeated 14 times. The target dimensions of the monolithic ceramic capacitor were about 1.60 mm×about 0.80 mm×about 0.50 mm.

The monolithic ceramic capacitor according to Example 3 had a structure substantially the same as that of the monolithic ceramic capacitor 1g of the eighth preferred embodiment described with reference to FIGS. 11(1) to11(8). In this monolithic ceramic capacitor of Example 3, the thickness of each ceramic layer was about 2.0 μm, the thickness of each inner electrode was about 1.0 μm, the diameter of each same-polarity-electrode-connecting via conductor was about 40 μm, the width of each leading portion of the inner electrodes was about 120 μm, and the thickness of outer layers was about 80 μm. The lamination period shown in FIGS. 11(1) to 11(8) was repeated 14 times. The target dimensions of the monolithic ceramic capacitor were about 1.60 mm×about 0.80 mm×about 0.50 mm.

Figure 12:
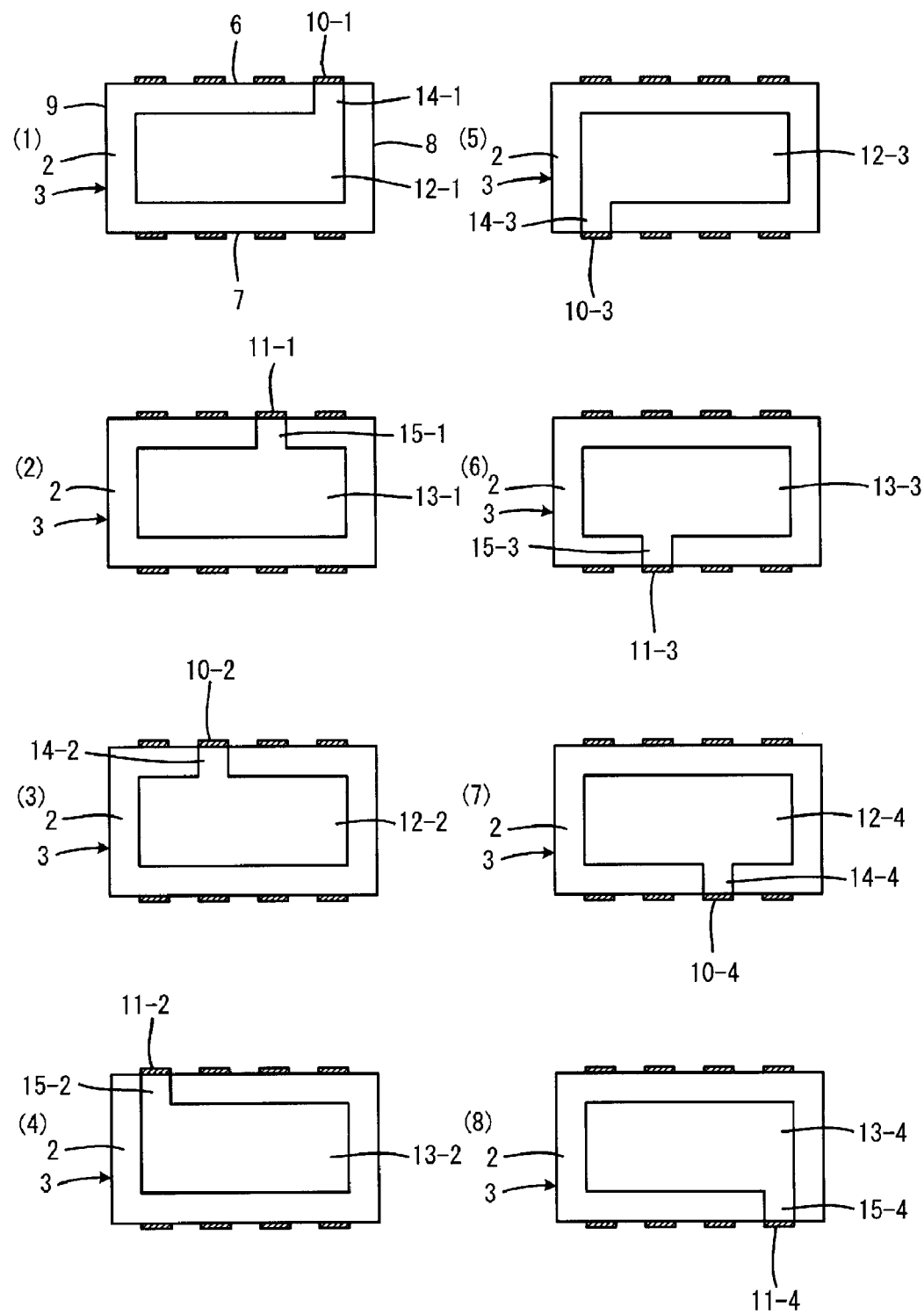
FIGS. 12(1) to 12(8) are views illustrating a monolithic ceramic capacitor prepared as a comparative example in experimental examples and corresponding to FIGS. 3(2) to 3(9), respectively.

The monolithic ceramic capacitor according to the comparative example had patterns of inner electrodes shown in FIGS. 12(1) to 12(8). In FIGS. 12(1) to 12(8), elements corresponding to those shown in FIGS. 3(2) to 3(9) are assigned the same reference numerals, and a description of those common elements is omitted. As is apparent from the comparison between FIGS. 12(1) to 12(8) and FIGS. 3(1) to 3(10), the monolithic ceramic capacitor of this comparative example does not include the same-polarity-electrode-connecting conductors and has substantially the same structure as that in Japanese Unexamined Patent Application Publication No. 2001-284170 described above. In this monolithic ceramic capacitor of the comparative example, the thickness of each ceramic layer was about 2.0 μm, the thickness of each inner electrode was about 1.0 μm, the width of each leading portion of the inner electrodes was about 120 μm, and the thickness of outer layers was about 80 μm. The lamination period shown in FIGS. 12(1) to 12(8) was repeated 14 times. The target dimensions of the monolithic ceramic capacitor were about 1.60 mm×about 0.80 mm×about 0.50 mm.

In all the monolithic ceramic capacitors in Examples 1 to 3 and the comparative example, a ceramic material including BaTiO$_3$ as a main component was used for the ceramic layers, and Ni was used as a conductive component of the inner electrodes, the same-polarity-electrode-connecting conductors, and the same-polarity-electrode-connecting via conductors. The outer electrodes were prepared by forming an underlayer including Cu as a conductive component, and then forming a Ni layer and a Sn layer by plating in that order. The ceramic laminates were fired in a reduced atmosphere at a top temperature of about 1,200° C. The outer electrodes were baked in a reduced atmosphere at a top temperature of about 850° C.

The capacitances between adjacent first and second outer electrodes were measured with a C-meter 4278A manufactured by Agilent Technologies, Inc. using the above monolithic ceramic capacitors of Examples 1 to 3 and the comparative example. The results are shown in Table 1. In Table 1, the first outer electrodes are represented by reference numerals 10-1 to 10-4, and the second outer electrodes are represented by reference numerals 11-1 to 11-4. In Table 1, for example, the expression "11-4/10-1" means the capacitance measured between the second outer electrode 11-4 and the first outer electrodes 10-1.

TABLE 1

| | 11-4/10-1 | 10-1/11-1 | 11-1/10-2 | 10-2/11-2 | 11-2/10-3 | 10-3/11-3 | 11-3/10-4 | 10-4/11-4 | Total |
|---|---|---|---|---|---|---|---|---|---|
| Example 1 | 1.012 | 1.001 | 0.991 | 0.997 | 1.001 | 0.999 | 1.001 | 0.996 | — |
| Example 2 | 0.997 | 0.997 | 0.997 | 1.004 | 0.993 | 0.989 | 0.983 | 0.999 | — |
| Example 3 | 1.006 | 1.003 | 1.000 | 1.010 | 0.988 | 1.004 | 0.995 | 1.004 | — |
| Comparative example | 0.138 | 0.142 | 0.146 | 0.116 | 0.127 | 0.137 | 0.133 | 0.108 | 1.047 |

As is apparent from Table 1, in Examples 1 to 3, a capacitance of about 1 µF was obtained in any combinations of adjacent first and second outer electrodes. In contrast, in the comparative example, a capacitance in the range of about 0.108 µF to about 0.146 µF was obtained in adjacent first and second outer electrodes. In the comparative example, a capacitance of about 1 µF was obtained when all the capacitances were summed up.

Consequently, according to Examples 1 to 3, even when a defect, such as a solder crack, is generated on a certain outer electrode, the total capacitance is ensured.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A monolithic ceramic capacitor comprising:
    a ceramic laminate including a plurality of laminated ceramic layers and having a first principal surface and a second principal surface facing each other and side surfaces connecting a periphery of the first principal surface and a periphery of the second principal surface;
    a plurality of first outer electrodes provided on the at least one of the side surfaces of the ceramic laminate and to which a first polarity is assigned;
    a plurality of second outer electrodes provided on the at least one of the side surfaces of the ceramic laminate and to which a second polarity is assigned;
    a plurality of first inner electrodes provided inside the ceramic laminate, each of which being electrically connected to only one of the plurality of first outer electrodes;
    a plurality of second inner electrodes provided inside the ceramic laminate so that the second inner electrodes and the first inner electrodes are alternately disposed, and each of which being electrically connected to only one of the plurality of second outer electrodes;
    a first same-polarity-electrode-connecting conductor provided inside the ceramic laminate being electrically connected to at least two of the plurality of first outer electrodes; and
    a second same-polarity-electrode-connecting conductor provided inside the ceramic laminate being electrically connected to at least two of the second outer electrodes.

2. The monolithic ceramic capacitor according to claim 1, wherein the first same-polarity-electrode-connecting conductor is electrically connected to all the plurality of first outer electrodes.

3. The monolithic ceramic capacitor according to claim 2, wherein a single first same-polarity-electrode-connecting conductor is provided inside the ceramic laminate.

4. The monolithic ceramic capacitor according to claim 1, wherein a plurality of the first same-polarity-electrode-connecting conductors are successively disposed in the laminating direction inside the ceramic laminate.

5. The monolithic ceramic capacitor according to claim 1, wherein the second same-polarity-electrode-connecting conductor is electrically connected to all the plurality of second outer electrodes.

6. The monolithic ceramic capacitor according to claim 5, wherein a single second same-polarity-electrode-connecting conductor is provided inside the ceramic laminate.

7. The monolithic ceramic capacitor according to claim 1, wherein a plurality of the second same-polarity-electrode-connecting conductors are successively disposed in the laminating direction inside the ceramic laminate.

8. The monolithic ceramic capacitor according to claim 1, wherein
    the first same-polarity-electrode-connecting conductor is disposed between the first inner electrode of the plurality of first inner electrodes disposed closest to the first principal surface and the first principal surface, the first inner electrode being adjacent to the first same-polarity-electrode-connecting conductor; and
    the second same-polarity-electrode-connecting conductor is disposed between the second inner electrode of the plurality of second inner electrodes disposed closest to the second principal surface and the second principal surface, the second inner electrode being adjacent to the second same-polarity-electrode-connecting conductor.

9. The monolithic ceramic capacitor according to claim 1, wherein the second same-polarity-electrode-connecting conductor is disposed between the second inner electrode of the plurality of second inner electrodes disposed closest to the second principal surface and the second principal surface, the second inner electrode being adjacent to the second same-polarity-electrode-connecting conductor; and the first same-polarity-electrode-connecting conductor is disposed between the second principal surface and the second same-polarity-electrode-connecting conductor.

10. The monolithic ceramic capacitor according to claim 9, wherein when the monolithic ceramic capacitor is surface-mounted on a wiring substrate, the second principal surface being disposed so as to face the wiring substrate.

11. The monolithic ceramic capacitor according to claim 1, wherein
the side surfaces include a first side surface and a second side surface facing each other; and
the first same-polarity-electrode-connecting conductor is electrically connected to only the first plurality of outer electrodes provided on the first side surface.

12. The monolithic ceramic capacitor according to claim 1, wherein
the side surfaces include a first side surface and a second side surface facing each other; and
the first same-polarity-electrode-connecting conductor is electrically connected to the first outer electrodes provided on the first side surface and to the first outer electrodes provided on the second side surface.

13. A monolithic ceramic capacitor comprising:
a ceramic laminate including a plurality of laminated ceramic layers and having a first principal surface and a second principal surface facing each other and side surfaces connecting a periphery of the first principal surface and a periphery of the second principal surface;
a plurality of first outer electrodes provided on the at least one of the side surfaces of the ceramic laminate and to which a first polarity is assigned;
a plurality of second outer electrodes provided on the at least one of the side surfaces of the ceramic laminate and to which a second polarity is assigned;
a plurality of first inner electrodes provided inside the ceramic laminate and being electrically connected to only one of the plurality of first outer electrodes;
a plurality of second inner electrodes provided inside the ceramic laminate so that the second inner electrodes and the first inner electrodes are alternately disposed and each of which being electrically connected to only one of the plurality of second outer electrodes;
a first same-polarity-electrode-connecting via conductor provided so as to extend the ceramic layers in the thickness direction inside the ceramic laminate and being electrically connected to the first inner electrodes but electrically isolated from the second inner electrodes; and
a second same-polarity-electrode-connecting via conductor provided so as to extend the ceramic layers in the thickness direction inside the ceramic laminate and being electrically connected to the second inner electrodes but electrically isolated from the first inner electrodes.

14. The monolithic ceramic capacitor according to claim 13, wherein the number of each of the first same-polarity-electrode-connecting via conductors and the second same-polarity-electrode-connecting via conductors is one.

* * * * *